R. F. GIBSON & S. M. COWDEN.
Cultivator.
No. 219,710. Patented Sept. 16, 1879.
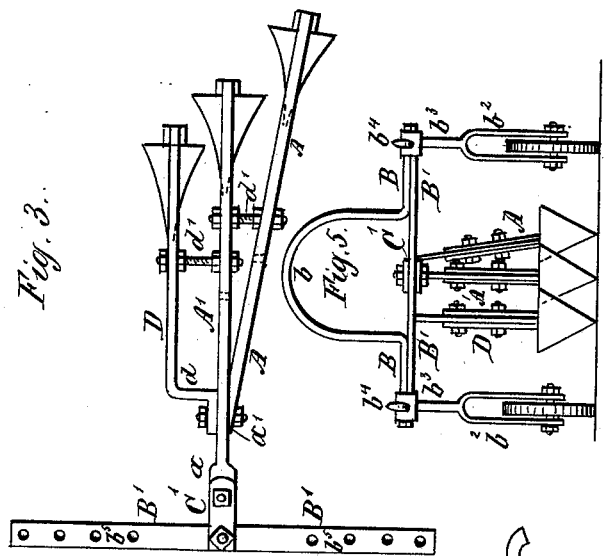
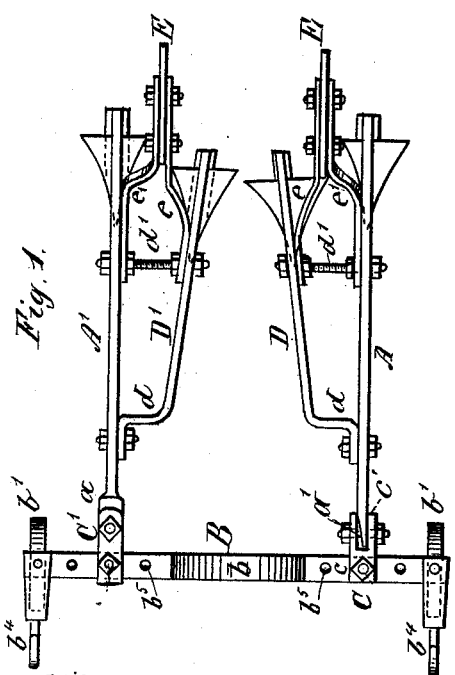
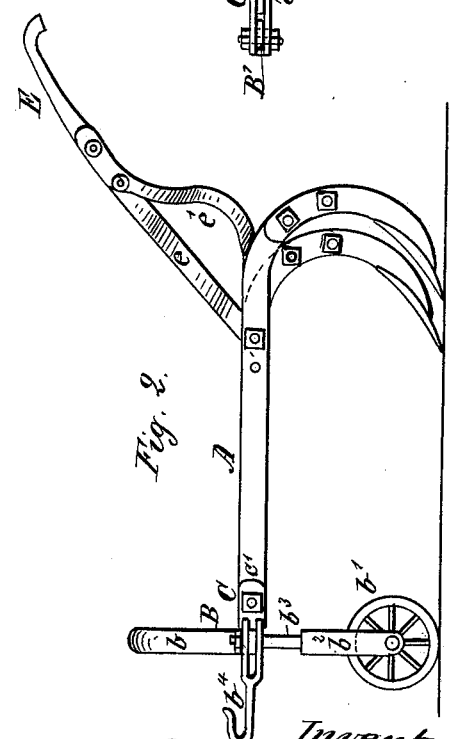

UNITED STATES PATENT OFFICE.

RICHARD F. GIBSON AND SYLVESTER M. COWDEN, OF TUSCALOOSA COUNTY, ALABAMA.

IMPROVEMENT IN CULTIVATORS.

Specification forming part of Letters Patent No. 219,710, dated September 16, 1879; application filed July 12, 1879.

*To all whom it may concern:*

Be it known that we, RICHARD FENDALL GIBSON and SYLVESTER MONROE COWDEN, of Tuscaloosa county, State of Alabama, have invented new and useful Improvements in Cultivators, of which the following is a specification.

Our invention relates to the peculiar construction of cultivators, as hereinafter described, and shown in the accompanying drawings, in which—

Figure 1 is a plan view, and Fig. 2 a side elevation, of a cultivator-plow constructed according to our invention. Figs. 3 and 4 are a plan and side elevation, respectively, of the cultivator-plow converted into a gang-plow; and Fig. 5 is a front elevation of the same.

Like letters of reference are employed to indicate like parts wherever such may occur.

A and A' represent two plow-beams, the latter having its forward extremity, $a$, turned to present the flat perforated horizontal surface, as shown. These plow-beams are secured to a draft-bar, B, which, when used for cultivating young crops, has a central arch, $b$, to permit it to ride freely over the crop without injuring it; but when the crop is quite small we employ a straight draft-bar, B', as shown in Figs. 3 and 4. The connection of the plow-beams A A' with the draft-bar is such as to permit a vertical as well as a horizontal movement to the plow-beam A and a horizontal movement to the beam A', so that when the plow is carried upon the wheels $b^1$, pivoted upon the draft-bar, the latter cannot be thrown to the ground by the wheels slipping from under it; and to that end we employ a double-forked connecting-plate or clevis, C, for the beam A, having its fork $c$ in a horizontal plane and that $c'$ in a vertical plane, and when pivoted to the draft-bar at $c$ will permit a free horizontal and vertical movement to the plow-beam A. The clevis or connecting-fork C', for the beam A', is, on the contrary, formed in the same plane with that of the draft-bar, so as to permit a horizontal movement only to the said plow-beam A'.

The wheels $b^1$ are mounted, as usual, in a forked bearing, $b^2$, at the lower end of the spindle $b^3$, which is pivoted to the draft-bar B, and to which latter and the standard or spindle $b^3$ are pivoted the draft-hooks $b^4$, to which are attached the single-trees or traces for the draft animal or animals.

The draft-bar B is further provided with a series of adjusting-holes, $b^5$, by means of which and the connecting-bolts the plows may be adjusted laterally, as will be readily understood.

The plow-beam A has its forward end beveled off for some distance, as shown at $a^1$, for a purpose presently described.

D D' represent two other plow-beams, having their forward ends bent at right angles, as shown at $d$, to permit of their being bolted to the beams A A' and leave the desired distance between the two. They are further connected together by means of the bolts $d'$, which also serve as supports for the handles E. These handles are so attached to the plows as to afford the greatest leverage, and to that effect their standards or braces $e$ are slightly bent inwardly, while their braces $e'$ are bent inwardly to a greater extent, so as to bring the handle on a line not quite central of the two plow-beams A D and A' D', as plainly shown in Fig. 1. By this means we are not only able to use shorter handles than usual, but also to give them the required strength to prevent their breaking without materially increasing their thickness.

When it is desired to convert the cultivator into a gang-plow, we take the plow-beam A' and bolt thereto on opposite sides the beams A D; and in order to leave the necessary distance between the plow-beams A' A and permit of their being adjusted, the forward edge of the latter is beveled off for some distance, as already explained, to set said beam A at an angle to the beam A', and their relative positions are maintained by means of the bolts and nuts $d'$, to which the handles are also attached. For this purpose the plow-beams A A' are provided with two or more bolt-holes, $a^2$ $a^3$, so that they may be adjusted to the distance required to follow each other properly and the beam D, and to maintain the required distance between them.

It will be seen that by means of this our improved construction and arrangement of convertible cultivator we provide a cheap and effective device for cultivating growing crops, or for use as a gang-plow.

When crops planted closely together are to be cultivated or plowed which would not permit of the use of the two shovel-plows in a row, the plow-beams D D' may be readily detached, and the plow-beams A A', with their shovels or other cultivating implements attached, may be used alone.

It will be observed that the two pairs of plows are flexibly connected together at their forward ends only by means of the draft-bar, instead of being rigidly connected at some point at their rear ends, and in which case the movement of one set of plows must follow that of the other. Under certain circumstances, and especially in the cultivation of cotton, this is detrimental to thorough cultivation and hilling, inasmuch as the two sets of plows can not invariably be made to follow the lines of plants. We therefore leave the two sets of plows entirely disconnected at their rear ends, as has been done before in cultivators of this class, and give them free motion at their point of attachment to the draft-bar, so that each individual set may be guided independently to insure the best cultivation.

It will also be evident that instead of dispensing with the arched draft-bar when the plow is converted for use as a gang-plow, the straight flat draft-bar B' or a short draft-bar may be attached to the underside of the arched draft-bar, as shown in Fig. 5, and thus the latter need not be detached from the wheels.

Having now described our invention, what we claim is—

The combination, in a convertible cultivator, of the draft-bar B and its supporting-wheels, the draft-bar B', the clevises C C', the plow-beams A A', the former having its forward end beveled, the plow-beams D D', the adjusting-bolts $d'$, the handles E, and their braces $e$ $e'$, all arranged, constructed, and operating substantially as shown and described.

In witness that we claim the foregoing we have hereunto set our hands.

RICHARD F. GIBSON.
SYLVESTER M. COWDEN.

Witnesses:
MONROE DONOHO,
W. C. JEMISON.